(12) United States Patent
Landphair et al.

(10) Patent No.: US 8,695,396 B2
(45) Date of Patent: Apr. 15, 2014

(54) METHOD OF CALIBRATING THE METER OF A PRODUCT DISTRIBUTION APPARATUS AND MONITORING METHOD

(75) Inventors: Donald K Landphair, Bettendorf, IA (US); James Z. Liu, Belvidere, IL (US); Lawrence D. Green, Bettendorf, IA (US); James J. Phelan, Bettendorf, IA (US); Samuel Santiago, Colona, IL (US)

(73) Assignee: Deere & Company, Moline, IL (US)

( * ) Notice: Subject to any disclaimer, the term of this patent is extended or adjusted under 35 U.S.C. 154(b) by 761 days.

(21) Appl. No.: 12/855,173

(22) Filed: Aug. 12, 2010

(65) Prior Publication Data
US 2012/0036914 A1 Feb. 16, 2012

(51) Int. Cl.
*G01F 25/00* (2006.01)

(52) U.S. Cl.
USPC .......................................................... 73/1.16

(58) Field of Classification Search
USPC .......................................................... 73/1.16
See application file for complete search history.

(56) References Cited

U.S. PATENT DOCUMENTS

| | | | |
|---|---|---|---|
| 3,595,078 A | 7/1971 | Beck et al. | |
| 3,682,393 A * | 8/1972 | Mackinnon | 239/651 |
| 3,730,395 A | 5/1973 | Gallogly et al. | |
| 3,844,174 A | 10/1974 | Chabre | |
| 4,000,398 A | 12/1976 | Conner | |
| 4,079,362 A | 3/1978 | Grimm et al. | |
| 4,238,790 A | 12/1980 | Balogh et al. | |
| 4,280,419 A | 7/1981 | Fischer | |
| 4,401,909 A | 8/1983 | Gorsek | |
| 4,570,491 A | 2/1986 | Machnee | |
| 4,651,331 A | 3/1987 | Harrsen et al. | |
| 4,719,805 A | 1/1988 | Volk et al. | |
| 4,933,589 A | 6/1990 | Strubbe | |
| 5,065,632 A | 11/1991 | Reuter | |
| 5,177,470 A | 1/1993 | Repas | |
| 5,253,534 A * | 10/1993 | Hamilton, Jr. | 73/1.16 |
| 5,343,761 A | 9/1994 | Myers | |
| 5,561,250 A | 10/1996 | Myers | |
| 5,598,794 A | 2/1997 | Harms et al. | |

(Continued)

FOREIGN PATENT DOCUMENTS

| | | |
|---|---|---|
| DE | 3821738 A1 | 1/1990 |
| DE | 19527678 A1 | 1/1997 |

(Continued)

OTHER PUBLICATIONS

European Search Report, (5 pages).

(Continued)

*Primary Examiner* — R. A. Smith
*Assistant Examiner* — Alex Devito

(57) ABSTRACT

A product distribution apparatus, shown in the form of an agricultural air seeder is disclosed having sensors to measure the mass flow through the distribution system, sensors to weigh the tank and the product therein, and sensors to measure the quantity of product in the tank. The sensors are used to measure the change in the quantity of product in the tank during a calibration process where the apparatus is operated over an area and the number of rotations of the meter are recorded. The data is then used to determine a mass flow rate per revolution of the meter. A monitoring method is also disclosed in which an 'area to empty' and 'product needed' to complete a field or task is displayed to the operator.

10 Claims, 3 Drawing Sheets

(56) References Cited

U.S. PATENT DOCUMENTS

| | | |
|---|---|---|
| 5,650,609 A | 7/1997 | Mertins et al. |
| 5,831,539 A | 11/1998 | Thomas et al. |
| 5,831,542 A | 11/1998 | Thomas et al. |
| 5,923,262 A | 7/1999 | Fuss et al. |
| 5,936,234 A | 8/1999 | Thomas et al. |
| 5,996,516 A | 12/1999 | Benneweis et al. |
| 6,081,224 A | 6/2000 | Rosenbrock |
| 6,093,926 A | 7/2000 | Mertins et al. |
| 6,192,813 B1 | 2/2001 | Memory et al. |
| 6,213,690 B1 | 4/2001 | Gregor et al. |
| 6,285,938 B1 | 9/2001 | Lang et al. |
| 6,296,425 B1 | 10/2001 | Memory et al. |
| 6,505,569 B1 | 1/2003 | Richard |
| 6,516,676 B1 | 2/2003 | Mullowney, Jr. |
| 6,584,920 B1 | 7/2003 | Cresswell |
| 6,644,225 B2 | 11/2003 | Keaton |
| 6,661,514 B1 | 12/2003 | Tevs et al. |
| 7,073,314 B2 | 7/2006 | Beck et al. |
| 7,182,029 B2 | 2/2007 | Johnson et al. |

FOREIGN PATENT DOCUMENTS

| | | |
|---|---|---|
| DE | 19908141 A1 | 8/2000 |
| EP | 0255630 B1 | 2/1988 |
| EP | 1744031 | 1/2007 |

OTHER PUBLICATIONS

John Deere Operator Manual for the 1910 Commodity Air Cart (N.A. Edition), Section 80. Product Brochure [online]. Retrieved in Aug. 2013. <http://manuals.deere.com/omview/OMA91764_19/?tM=FR>.

* cited by examiner

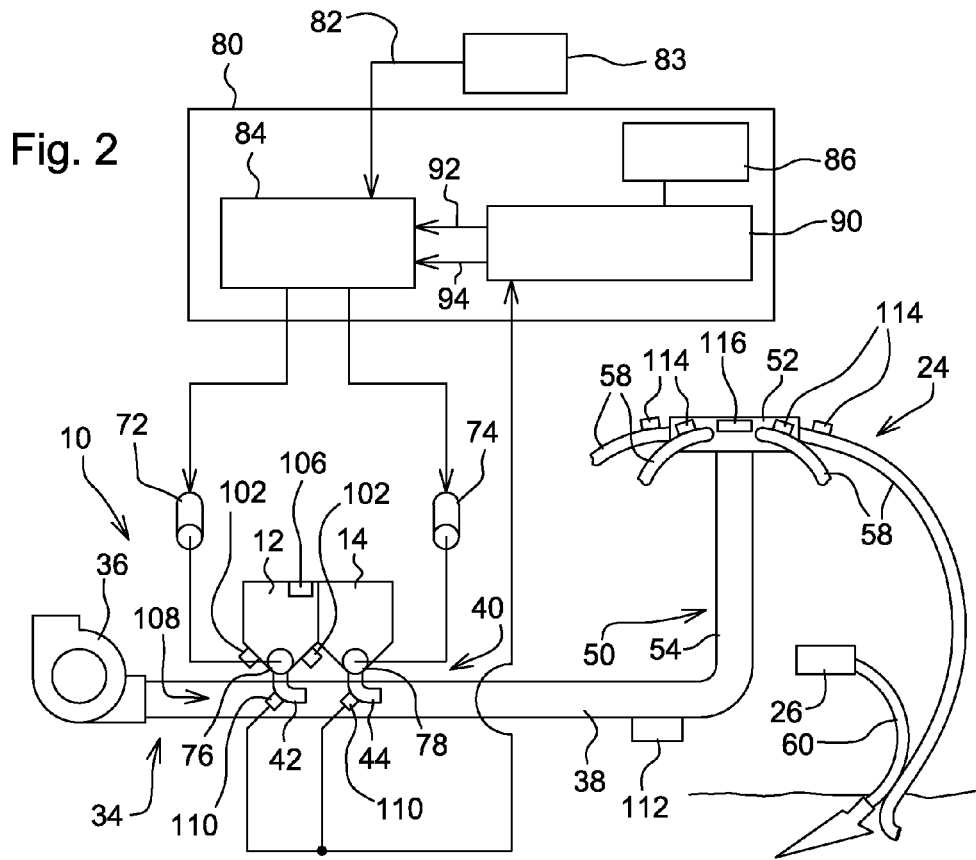
Fig. 2
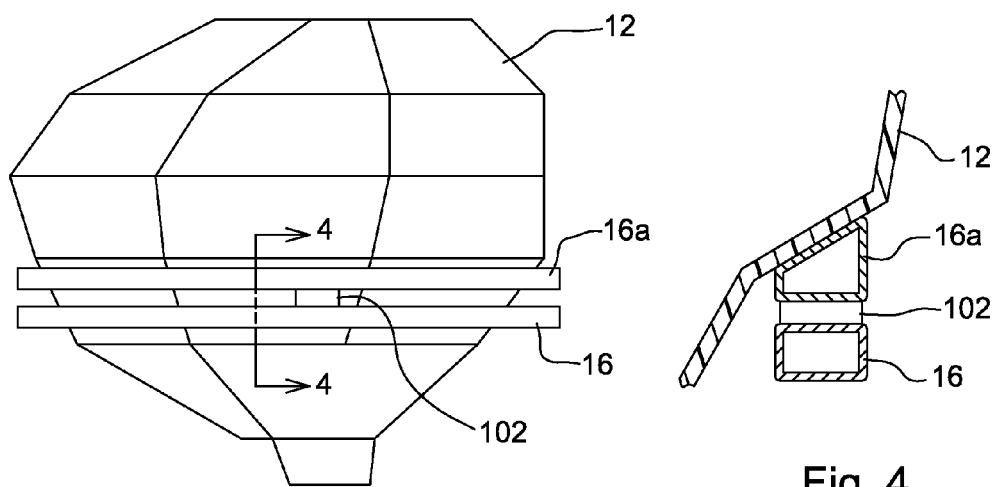
Fig. 3
Fig. 4

METHOD OF CALIBRATING THE METER OF A PRODUCT DISTRIBUTION APPARATUS AND MONITORING METHOD

DETAILED DESCRIPTION

A product distributing apparatus is described as well as various methods of calibrating the meter of the apparatus. Additionally, the display of various information to the operator is also described. One application of such an apparatus and method is in an agricultural air seeder and it is in this context that the apparatus is described. Other applications in the agricultural context include row crop planters, box drills, fertilizer applicators chemical or soil supplement applicators etc. Applications beyond agriculture include any instance where a product is to be distributed over an area. In the Figures:

FIG. 2 is a schematic diagram of the implement and sensors;

FIG. 3 is side elevation view of a product tank;

FIG. 4 is a sectional view of the product tank as seen from the line 4-4 of FIG. 3;

Figure 1:
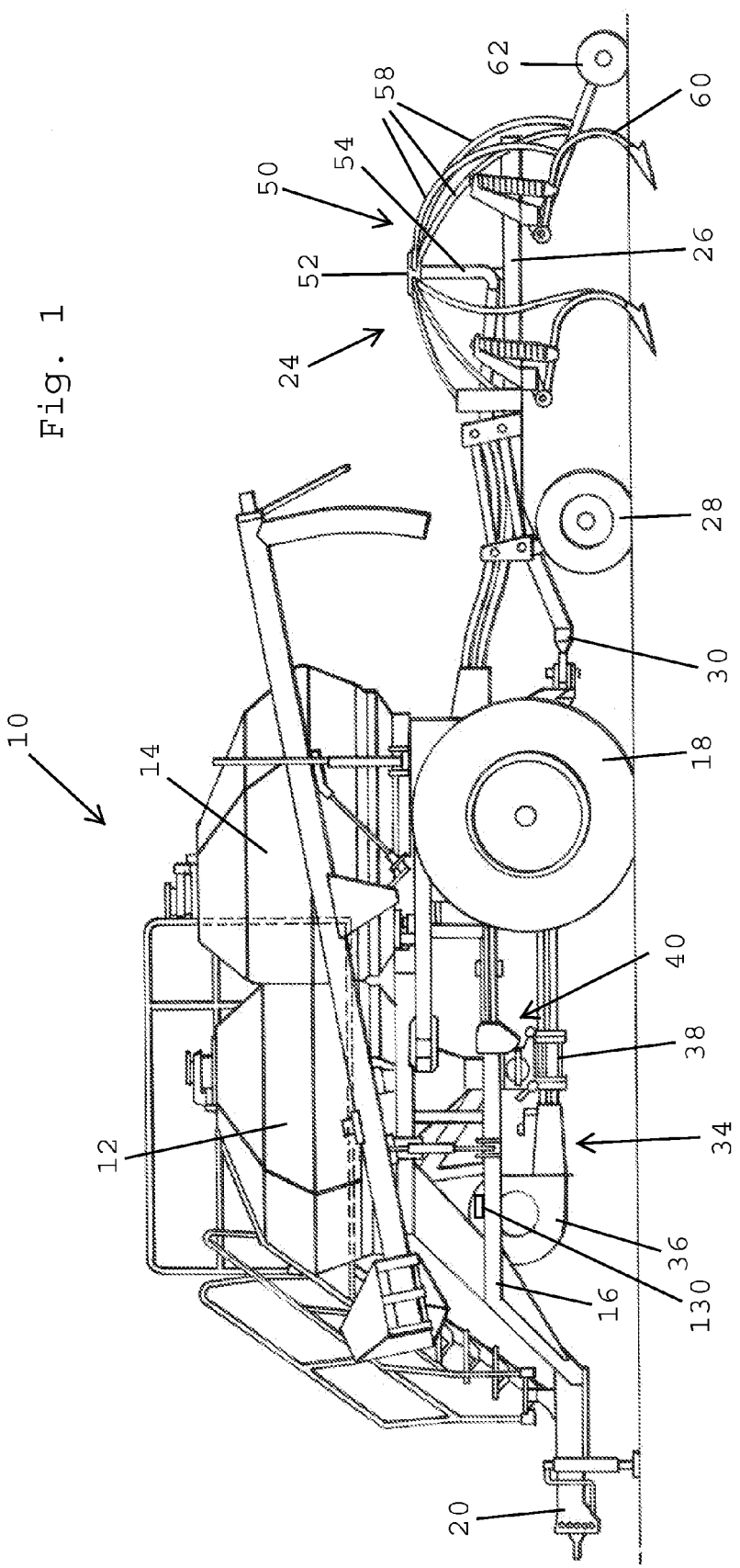
FIG. 1 is a side elevation view of an agricultural air seeder.
Figure 5:
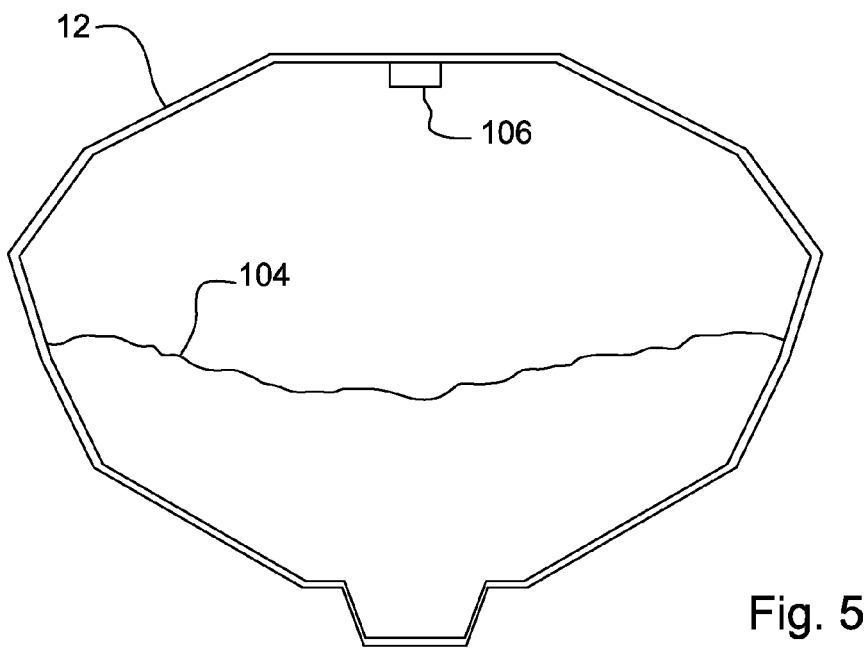
FIG. 5 is a sectional view showing the interior of the tank 12.
Figure 6:
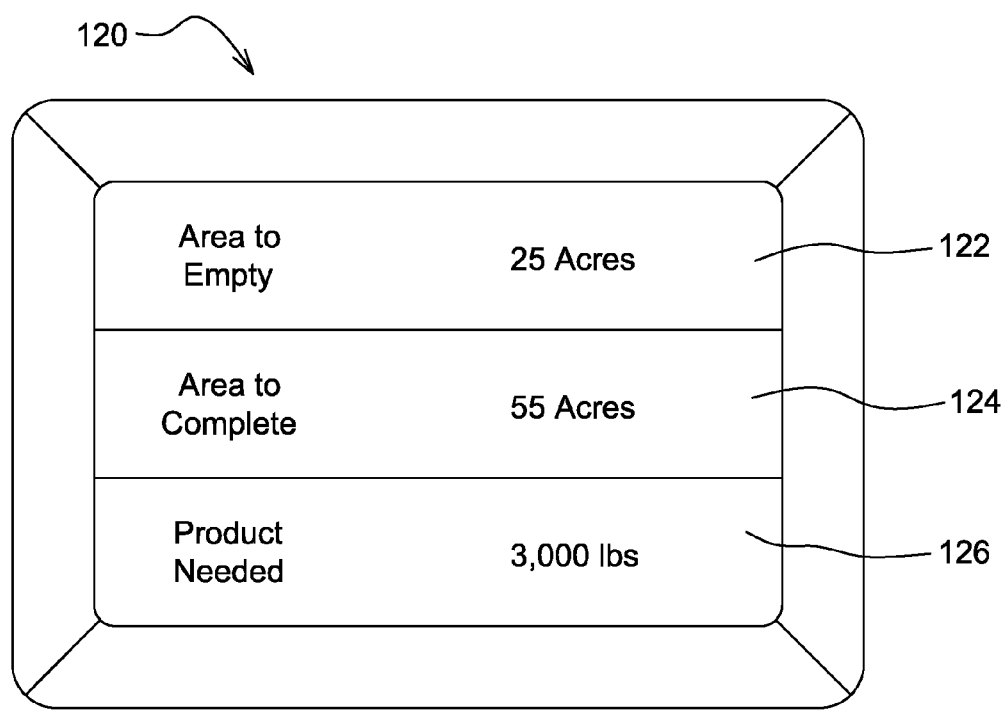
FIG. 6 is a plan view of the implement monitor illustrating information displayed to the operator.

Referring to FIG. 1, therein is shown an agricultural seeding and fertilizing implement 10 commonly referred to as an air seeder. Implement 10 includes tanks 12 and 14 for containing materials to be distributed to the soil. The tanks 12 and 14 are mounted on a main frame 16 supported by ground wheels 18 for forward movement over a surface, such as the ground, by a towing vehicle (not shown) connected to a forward hitch 20. A ground-engaging implement 24 includes a frame 26 supported by ground wheels 28 and connected to the rear of the main frame 16 by a hitch 30. Alternative arrangements may place the ground engaging implement in front of the air seeder or the air seeder and the ground engaging implement can be combined onto a common frame. The tanks 12 and 14 can be any suitable device for holding the material to be dispensed. They could be hoppers, bins, boxes, containers, etc. The term "tank" shall be broadly construed herein.

An air distribution system 34 includes a fan 36 connected to a product delivery conduit structure 38. The fan 36 directs air through the conduit structure 38. A product metering mechanism 40 is located at the lower end of each tank 12 and 14, only one of which is shown in FIG. 1, and controls the rate of discharge of the products from the tanks 12 and 14 through product passages 42 and 44 into the product delivery conduit structure 38. The particular type of meter is not important to the apparatus, however, in most instances, the meter will be a volumetric meter. The delivery conduit structure 38 consists of a plurality of individual conduits beneath each meter with separate product passages 42 or 44 directing product into each conduit. An example of such a distribution system is the John Deere 1910 Commodity Air Cart which is shown in detail in U.S. Pat. No. 6,213,698, incorporated herein by reference. Each conduit carries product rearwardly in the air stream to a secondary distribution tower 50. Typically, there will be one tower 50 for each conduit of the conduit structure. Each tower 50 includes an uppermost distributing head 52 located at the uppermost end of a vertical distribution tube 54. The head 52 evenly divides the flow of product into a number of secondary distribution lines 58. Each secondary distribution line 58 delivers product to a furrow formed by one of a plurality of openers 60 attached to the frame 26 at transversely spaced locations. A trailing firming or closing wheel 62 associated with each opener 60 firms the soil over the material deposited in the furrow. The implement 10 may be equipped with separate conduit structures 38 for each of the tanks 12 and 14 whereby different products can be distributed separately. Alternatively, the products from tanks 12 and 14 can be combined in a common conduit structure 38 as shown in FIG. 2 for distribution together. In other embodiments of the distribution system, the conduits may be selectively configurable to combine the products from tanks 12 and 14 into common conduits or to not combine the products. While two tanks 12 and 14 are shown with the associated metering mechanisms 40 and conduit structures 38, it will be understood that any number of tanks, etc. can be provided on the implement 10 as desired.

The product metering mechanisms 40 include variable speed meter drives 72 and 74 (FIG. 2) connected to product meters 76 and 78 located at the bottom of the tanks 12 and 14 respectively. As the drives 72 and 74 rotate the meters 76 and 78, products from the tanks 12 and 14 are delivered via product passages 42 and 44 into the conduit structure 38 which, in turn, conveys the products to the distribution towers 50. A controller 80 controls the operation of the meters. A feed rate controller 84 connected to the variable speed meter drives 72 and 74 receives a speed signal at input 82 from a sensor 83 indicative of implement ground speed and adjusts the meter drive speeds to maintain a selected product flow rate with changing ground speed. An operator input device 86 is included in controller 80 for entering a desired product flow rate such as seeds per unit area (e.g. seeds per acre) or pounds per unit area, etc. The input device 86 can include a GPS-based system or other automated system to provide desired metering rates to a processor 90 depending upon location within the field. The processor 90 provides rate control inputs 92 and 94 to the controller 84. An operator and/or the feed rate controller 84 utilizes the speed signal and the inputs from the processor 90 to adjust the drives 72 and 74 to maintain the desired flow rates as more fully described below.

A variety of sensors and combinations of sensors are used in the control of the operation of the implement 10. One set of sensors are load cells used to determine the weight of each tank and its contents. With reference to FIGS. 3 and 4, the tank 12 is shown. Tank 12 is supported on the frame 16 by at least three load cells, scales or other devices 102 capable of measuring weight. The load cells enable the weight of the tank and product contained therein to be determined. By subtracting the fixed weight of the tank, the weight of the contents is determined. The load cells can be located anywhere that an accurate reading of the weight can be measured. Depending on the structure of the implement 10 and the configuration of the tank, it may be best to mount the tank on a sub-frame and include the load cells 102 between the sub-frame and the main frame 16.

The level of product 104 in the tank 12 is determined by one or more sensors 106 located at the top of the tank. The sensors 106 can be ultra-sonic sensors, 2D or 3D cameras, or a simple auto-focus camera where the auto-focus sensor output is used to determined the distance from the camera to the top of the pile of product 104. Multiple sensors 106 can be used in the tank to provide more accurate information of the contour of the top of the product pile as the top of the product pile will not likely be flat. The product volume of product in the tank is determined based on the sensed product level and known information defining the shape of the tank.

A mass flow sensor is provided in the product flow stream downstream of the product meter 76. A variety of types of sensors and locations are possible. An optical sensor 110 can be placed on each of the product passages 42 between the meter 76 and the air distribution system 34. One sensor known to perform well at this location is described in U.S. patent application Ser. No. 12/827,023, filed 30 Jun. 2010 and assigned to the same assignee as the present application. Application Ser. No. 12/827,023 is hereby incorporated by reference. The optical sensor 110 can, depending on the particle size and flow rate, count individual particles or seeds or can directly measure the mass flow by attenuation in the light intensity detected by the receiver side of the sensor. The mass flow sensors could be one of the following types: Coriolis, ultrasonic, float type, thin film, piezo-resonant, capacitance, Hall effect, magnetic flow sensor, turbine flow sensor, etc.

Ultrasonic flow sensors use sound frequencies above audible pitch to determine flow rates. They can be either Doppler effect sensors or time-of-flight sensors. Doppler flow sensors measure the frequency shifts caused by fluid flow. The frequency shift is proportional to the fluid's velocity. Time of flight sensors use the speed of the signal traveling between two transducers that increases or decreases with the direction of transmission and the velocity of the fluid being measured.

Turbine flow sensors measure the rate of flow in a pipe or process line via a rotor that spins as the media passes through its blades. The rotational speed is a direct function of flow rate and can be sensed by magnetic sensors or photoelectric sensors.

Broadly speaking, any mass flow sensor adapted to measure solid particle mass flow can be used. The type of sensor is not limited to those listed above.

Any of the above mass flow sensors can be located on the primary distribution pipe 38 of the distribution system 34 as shown at 112. One difficulty of this location is the possibility of a single shot system where the primary distribution pipe 38 conveys two products instead of only one. However, with the appropriate control algorithm and process, the flow rate of the individual products can be determined. A third location for a mass flow sensor is in the secondary distribution lines 58, shown by the sensors 114. One sensor 114 is located on each secondary line 58. If it is desired to use fewer sensors than there are lines 58, some can be omitted. The sensor outputs of those secondary lines 58 that do have a sensor 114 are used as a proxy for the mass flow in the secondary lines 58 not equipped with a sensor. Again, at this location, there may be multiple materials flowing and a control system algorithm and method may be used to determine the flow rate of individual products. One benefit of locating the sensors in the secondary distribution lines 58 is that the flow in any one line 58 is less than in the primary distribution lines 38 or in the product passages 42.

A mass flow impact sensor can also be used in the distribution system. A sensor 116 located at the top of the tower 50 where it is impacted by the product in the air stream moving upward in the tower 50. The product impacts the sensor and changes direction to flow through one of the secondary distribution lines 58. It should be noted that in FIG. 2, wires from the sensors to the processor 90 are not shown.

In operation, the sensors are used as described below. With the implement 10 having individual product tanks, the load cells 102 can be used to weigh the contents of the tanks at any time. That is, when initially filled, any time during use although it may be necessary to stop the implement and weigh the contents while stationary to get an accurate measurement, and after a given area or field is completed. With an implement having one tank that is divided into separate bins or compartments, the product weight of each product is measured when the tank is initially filled. For example, a weight measurement is taken before filling, after compartment 1 is filled to determine the product weight in compartment 1, after compartment 2 is filled to determine the product weight in compartment 2, etc. After each compartment is filled, the tank level sensors 106 in each tank are used to determine the volume of product. The initial weight and volume are then used to calculate a product density for each product.

A meter calibration process can be performed by the following steps. The process begins by setting the meter to a nominal calibration setting for the particular product in the tank. The implement is then operated over an area at the nominal meter calibration setting. The number of revolutions of the meter is captured and recorded while operating the implement in the previous step. The change in the quantity of product in the tank while operating the implement over the area is determined. Then, using the change in the quantity of product in the tank and the number of meter revolutions, a metering flow quantity per revolution is calculated. The meter is then set to a desired calibration setting based on the calculated meter flow quantity per revolution of the meter.

The change in the quantity of product in the tank can be determined a number of ways. One, the mass flow through the distribution system while operating the implement over the area can be measured by one or more of the sensors 110, 112, 114 and 116. The cumulative quantity of product distributed through the system 34 represents the change in the quantity of product in the tank. Second, for implements with individual tanks, the weight of product both before and after the operation of the implement over the area can be used to determine an initial quantity of product in the tank and determine a final quantity of product in the tank. By calculating the difference between the initial and final quantities of product in the tank, the change in product in the tank is determined. For tanks with multiple bins, the determination of the initial and final quantities of product in the tank is accomplished by sensing the volume of product in the tank. An initial and final volume of product is sensed and the difference in volume together with the product density is used to calculate the change in the quantity of product in the tank. As yet another method, if the product density is a known value, for example, supplied by the product supplier, then the only measurement needed is the level of product in the tank from sensors 106 to determine the change in product volume from which the change in the quantity of product in the tank is determined.

A monitor 120 displays useful information about the operation of the apparatus to the operator. The in-tank level sensors 106 can be used to continuously monitor the level of product in the tank. Alternatively, with a known initial quantity of product in the tank, the mass flow sensors in the distribution system can be used to measure the total mass distributed and from that, calculate the remaining quantity of product in the tank. With a known quantity of product in the tank and a known product distribution rate, the monitor can determine an 'area to empty' representing the area capable of being covered with the product remaining in the tank. This 'area to empty is then displayed to the operator in box 122 of the monitor 120.

With readily available field mapping software and guidance software, the monitor continuously monitors and keeps track of the area of the field that has been covered by the apparatus. With knowledge of the total area of the field to be covered, the monitor is able to determine the area remaining to be covered. This is the 'area to complete' and is displayed in box 124 on the monitor 120. With the known product distribution rate in terms of mass per acre, and the known quantity of product in the tank, the 'area to empty' is determined as described above. If the 'area to empty' is less than the area remaining to be covered, i.e. the 'area to complete', the difference between the two is determined. From this difference, and the product distribution rate, the quantity of product needed to complete the field is determined and displayed to the operator as 'product needed' in box 126.

While the bin level, area to empty and the product needed to complete the field can all be determined with the tank level sensors 106, greater precision can be obtained by combining the sensor 106 output with the output of the mass flow sensor in the distribution system. Further accuracy to the tank level measurements can result from the use of an inclinometer 130 mounted to the frame 16 of the implement 10, see FIG. 1. The inclinometer, which may be in the form of an accelerometer, detects the orientation or attitude in terms of pitch and roll of the tank. This can be used to refine the measurement of the sensor 106 in determining the quantity of product in the tank 12 by compensating for slope.

The benefit of using multiple sensors is to increase the reliability of the system by having sensor redundancy. Also, each sensor has an optimal operating condition and the system can weigh each sensors output so that it is given more weight when operating at its optimal conditions and less weight when it is not operating at optimal conditions. For example, two flow sensors have been described above. One is the optical sensor 110 and the other is the impact sensor 116. The impact sensor 116 is more sensitive and accurate with higher flow rates and heavier materials. In contrast, the optical sensor is more sensitive and accurate with light materials and low flow rates such as for canola. Thus, higher confidence and weight is given to each sensor when operating in commodities where it performs better.

The confidence of the sensors is also dependent on failure modes as well. For example, the weight sensor 102 does not perform well with a rough or bumpy ride or when the implement is tilted at a large angle. The optical sensor does not perform well when it is covered with dust and has a self-detection for dust coverage. The operating conditions are also considered in weighting of the sensor outputs. The multiple sensors provide increased reliability and further help the operator to understand when corrective action is necessary such as cleaning the optical sensor or slowing down when operating in a rough field.

While the apparatus is described in the context of an air seeder, it can be used in other applications where the level of a product in a mobile distribution system is needed. Other applications in agriculture include row crop planters equipped with a central commodity system that delivers product to the row units. By monitoring the level in the tanks, the area to empty and the product needed to complete can be determined and displayed on the monitor. Grain drills are another application as are fertilizer applicators and other soil treatment or supplement applicators, such as lime. The apparatus can also have application in road and highway maintenance where it is desired to know how much further the truck can travel before the salt or sand has been completely emptied from the truck.

Having described the apparatus, it will become apparent that various modifications can be made without departing from the scope of the invention as defined in the accompanying claims.

The invention claimed is:

1. A method of calibrating a meter in an agricultural seeder type of a distribution apparatus, the apparatus having a frame supported at least in part on wheels for movement over a soil surface, a tank for holding a product to be distributed, a meter at a lower end of the tank for controlling a rate of discharge of product from the tank, a distribution system receiving product from the meter, and distributing the product to a furrow opener where the product is placed into the soil, the method comprising:
   setting the meter to a nominal calibration setting for the product in the tank;
   operating the apparatus over an area at the nominal calibration setting, and distributing product to the soil;
   capturing the number of revolutions of the meter while operating the apparatus;
   determining the change in the quantity of product in the tank during the operation of the apparatus over the area;
   using the change in the quantity of product in the tank and the number of meter revolutions, calculating a meter flow quantity per revolution of the meter; and
   setting the meter to a desired calibration setting based on the calculated meter flow quantity per revolution of the meter.

2. The method of claim 1 wherein the apparatus includes at least one mass flow sensor in the distribution system and the change in the quantity of product in the tank is determined by measuring the flow of product as the product flows through the distribution system.

3. The method of claim 1 wherein the apparatus includes one or more sensors from the group of weight sensors between the tank and the frame and product level sensors in the tank, the sensors being used to determine the quantity of product in the tank and wherein the change in the quantity of product in the tank is determined by:
   determining an initial quantity of product in the tank before operation of the apparatus;
   determining a final quantity of product in the tank after operation of the apparatus; and
   calculating a difference between the initial and final quantities of product in the tank.

4. The method of claim 3 wherein the determination of the initial and final quantities of product in the tank includes weighing the tank and the product therein with one or more of the weight sensors.

5. The method of claim 3 wherein the determination of the initial and final quantities of product in the tank includes sensing the volume of product in the tank with one or more product level sensors.

6. The method of claim 5 wherein the apparatus includes an inclinometer and wherein the determination of the initial and final quantities of product in the tank includes sensing of the attitude of the apparatus.

7. The method of claim 3 wherein the determination of the initial and final quantities of product in the tank includes both sensing the volume of material in the tank with the product level sensor and weighing the tank and the product therein with the weight sensor.

8. The method of claim 1 wherein the apparatus includes at least one mass flow sensor in the distribution system and at least one product level sensor in the tank and wherein the change in the quantity of product in the tank is determined by both measuring the flow of product through the distribution system as the product flows through the distribution system with the at least one mass flow sensor and sensing the volume of material in the tank with the at least one product level sensor.

9. The method of claim 1 wherein the apparatus includes at least one mass flow sensor in the distribution system and at least one weight sensor between the tank and the frame and wherein the change in the quantity of product in the tank is determined by both measuring the flow of product through the distribution system as the product flows through the distribution system with the at least one mass flow sensor and weighing the tank and the product therein with the at least one weight sensor.

10. The method of claim 1 wherein the apparatus includes at least one mass flow sensor in the distribution system, at least one weight sensor between the tank and the frame and at least one product level sensor in the tank and wherein the change in the quantity of product in the tank is determined by measuring the flow of product through the distribution system with the at least one mass flow sensor, sensing the volume of material in the tank with the at least one product level sensor and weighing the tank and the product therein with the at least one weight sensor.

\* \* \* \* \*